United States Patent [19]
Hardy et al.

[11] Patent Number: 5,566,884
[45] Date of Patent: Oct. 22, 1996

[54] SUPERSONIC NOZZLE FOR A TURBOJET ENGINE

[75] Inventors: Jean-Marie E. C. Hardy, Le Mee Sur Seine; Gérard E. A. Jourdain, Saintry Sur Seine; Marcel R. Soligny, Chevilly Larue, all of France

[73] Assignee: Societe Natinale D'Etude et de Construction de Moteurs D'Aviation S.N.E.C.M.A., Paris Cedex, France

[21] Appl. No.: 336,491

[22] Filed: Dec. 30, 1981

[30] Foreign Application Priority Data

Dec. 30, 1980 [FR] France .................................. 80 27788

[51] Int. Cl.⁶ .................................................. F02K 1/12
[52] U.S. Cl. ............................................... 239/265.41
[58] Field of Search ........................... 60/230, 232, 271; 239/265.37, 265.39, 265.41

[56] References Cited

U.S. PATENT DOCUMENTS 3,899,133  8/1975  Camboulives et al. ............. 239/265.39
3,954,225  5/1976  Camboulives et al. ............. 239/265.41
4,000,854  1/1977  Konarski et al. ................... 239/265.39
4,241,876 12/1980  Pedersen ............................ 60/230

FOREIGN PATENT DOCUMENTS 1491861  7/1967  France .
2164594  8/1973  France .
2233499  1/1975  France .
2180440  6/1976  France .
2397534  2/1979  France .

Primary Examiner—Stephen C. Bentley
Attorney, Agent, or Firm—Bacon & Thomas

[57] ABSTRACT

Convergent flaps of a jet engine nozzle are controlled by actuating cylinders through actuating levers hinged to the fixed structure of the engine and by connecting rods. Divergent flaps are slaved to the convergent flaps by connecting rods themselves driven by the actuating levers. Cold flaps not hinged to the divergent flaps are slaved to the convergent flaps by further connecting rods connected to the first-named connecting rods.

12 Claims, 4 Drawing Sheets

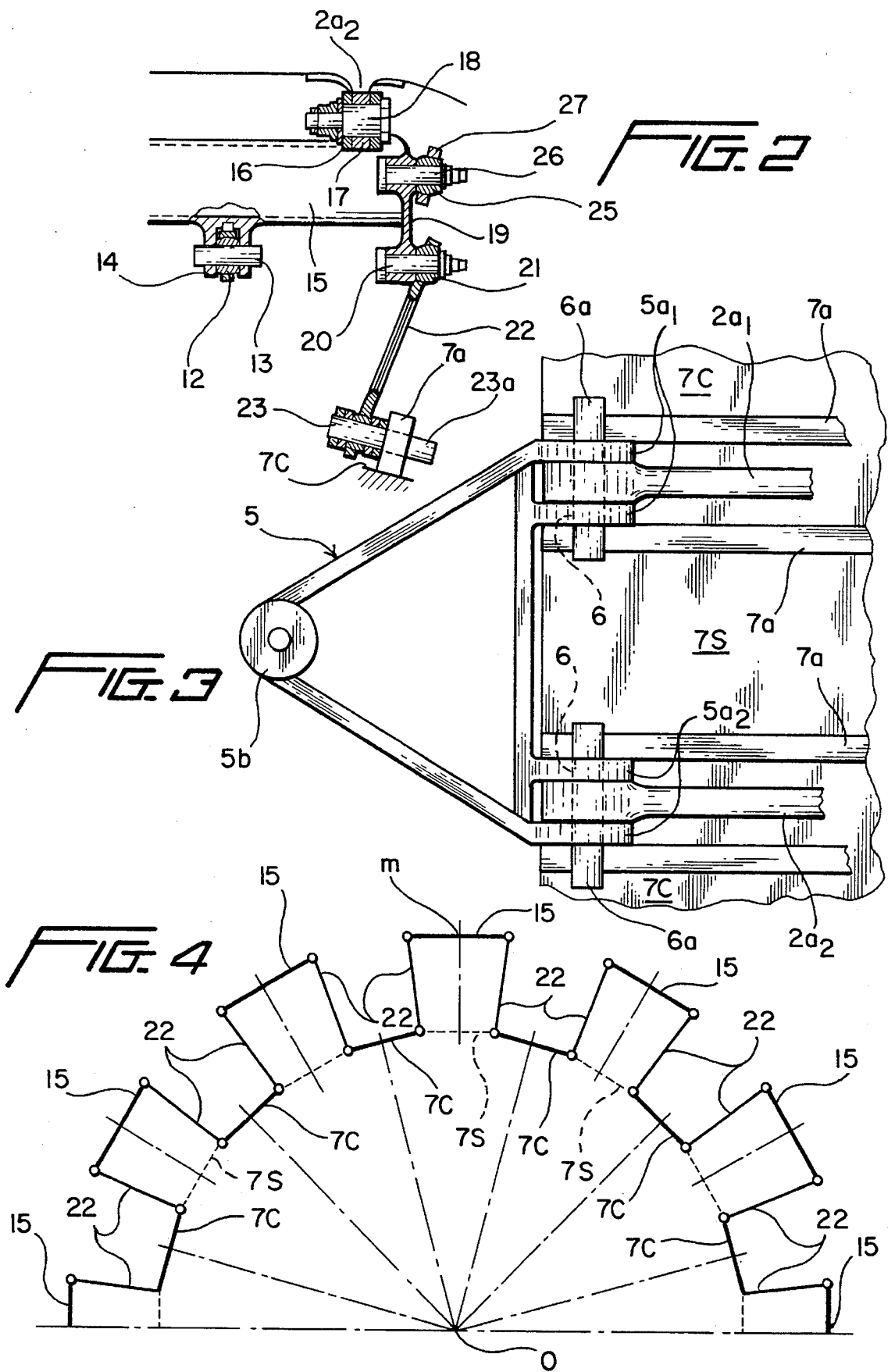

SUPERSONIC NOZZLE FOR A TURBOJET ENGINE

BACKGROUND OF THE INVENTION

The present invention concerns a supersonic nozzle, in particular for a turbojet engine.

Nozzles of this type are already known. They comprise essentially two annular systems, one of convergent flaps having their upstream edges hinged at the annular side of the duct outlet, the other of divergent flaps having their upstream edges hinged at the downstream edges of the convergent flaps. Drives, such as actuating cylinders are coupled, respectively, by transmission devices to at least some of the convergent flaps so as to cause them to pivot with respect to the edge of the duct in synchronism with each other. At the same time, the devices are designed to slave the positions of the divergent flaps with the positions of the convergent flaps. A device such as this makes it possible to continuously change the respective angles of the convergent flaps with respect to the nozzle axis, and to cause the angles of the divergent flaps to correspond with respect to the same axis in a positive manner. The designation "divergent flaps" does not exclude the possibility that under certain operating conditions the aforesaid flaps form the walls of a flow path with a constant section, or even with a convergent section. In fact, the two principal configurations of a supersonic nozzle such as this, and which were used when the nozzle was adapted for an aircraft turbojet engine, are, on the one hand the configuration corresponding to subsonic cruising speed, at which the divergent flaps are practically parallel to the axis of the nozzle, and, on the other hand, the configuration corresponding to the afterburner mode, permitting very high accelerations, and for which the divergent flaps are greatly tilted with respect to the axis of the nozzle.

In the majority of supersonic nozzles of known type, the devices used to transmit the control forces generated by the actuating drives, (generally actuating cylinders), comprise rods, connecting rods, levers, pivots, etc. These devices are distinct from the devices used to synchronize pivoting movement of the different convergent flaps, which generally comprise a ring concentric with the axis of the nozzle and coupled to the transmission devices mentioned. Devices of this type are described in French patents Nos. 72.42491, 74.08812, and 78.10546, for example.

SUMMARY OF THE INVENTION

The present invention makes it possible to simplify the devices utilized to transmit the forces generated by the drives to the flaps, as well as that of the devices used to synchronize the pivoting movements of the flaps.

The supersonic nozzle in accordance with the present invention is of the type indicated above, and is characterized by the fact that the devices used to transmit the forces generated by the drives to the convergent flaps, and the devices used to synchronize the movement of the convergent flaps, are formed by a unique annular toothed kinematic chain that comprises:

(a) actuating levers, each hinged by connecting rods to the fixed structure of the engine, and extending parallel to the axes of the hinges of their edges in the direction of the width of one of the follower convergent flaps;

(b) control connecting rods, each hinged at one end by swivels to the adjacent end of one of the actuating levers, and at the other end to the adjacent edge of the nearest convergent flap in a manner such as to control their pivoting, and;

(c) convergent flaps controlled by the aforesaid connecting rods.

Each actuating cylinder, is actuating cylinder, is positioned such that its control rod drives the intermediate part of one of the actuating levers through a swivel. Each edge at least one of the two divergent flaps is coupled to the closest end of one of the actuating levers by a connecting rod fitted with a swivel at at least one of its ends.

The control and synchronization device for the different pivoting flaps of the supersonic nozzle according to the present invention is thus to be distinguished from the corresponding devices that have been envisaged for nozzles of this type up to this time primarily for its simplicity, and the few number of parts of which it is comprised, the low total mass of these parts, which improves the ratio of maximum nozzle thrust to its total mass, which results in an improvement in reliability; and very easy maintenance of the device, the result of having just a few simple parts.

The present invention can be applied in a particularly advantageous fashion to supersonic nozzles of the type indicated above, each of which comprises, in addition, a third annular system of secondary flaps, called "cold" flaps, the upstream edges of which are hinged at the fixed structure of the nozzle. These flaps are located outside the actuating levers in a manner such that they extend at least to the downstream edges of the primary divergent flaps, and cover them without making contact in a manner such as to avoid any significant discontinuity between the aircraft nacelle and the nozzle proper. In this application the supersonic nozzle according to the present invention can be characterized by the fact that the position of at least one of two of the cold flaps is slaved to the position of the corresponding convergent flap by a system of connecting rods acting as hinges between them, one being hinged at the cold flap, the other at an intermediate point on one of the control connecting rods of the aforesaid convergent flap.

Already known, in particular through the French patents already mentioned, are supersonic nozzles fitted with cold flaps, the downstream edges of which are, however, hinged at the downstream edges of the primary divergent flaps. In order for a nozzle of this type to be able to take up all necessary configurations, it is however, inevitable, in particular to avoid too pronounced "breaks" in the external shape of the nacelle, or of the aircraft, at the point at which the cold flaps are hinged, to provide the divergent flaps and the cold flaps with relatively long lengths, something that presents obvious inconveniences, in the matter of mass in particular. French patent No. 1,491,861 also describes a supersonic nozzle with cold flaps that are not hinged to the divergent flaps, that is, never in contact with them. But in the case of this previously known nozzle, the angle of each of the divergent flaps, and of the cold flaps, is controlled, indirectly or directly, by the difference in the pressures acting on their two faces. What this reference involved is a therefore are nonmechanical control device, the efficiency of which certainly is very much lower than that of a mechanical control device acting positively on the pivoting flaps.

BRIEF DESCRIPTION OF THE DRAWINGS

Described below and illustrated schematically in the attached drawings, is one form of a supersonic nozzle in accordance with the present invention that comprises two systems of primary flaps and a third system of secondary, or cold, flaps.

FIG. 2 is a fragmentary view in the direction of arrow II in FIG. 1, showing only the mid portions of the tubular actuating lever.

FIG. 3 is a plan view of one of the tie-rods between the fixed structure of the nozzle and the outlet edge of its duct.

FIG. 4 is a schematic view illustrating the mid portions of the annular kinematic chain that serves to transmit the control forces to the convergent flaps and to synchronize the pivoting movements of these flaps.

DESCRIPTION OF A PREFERRED EMBODIMENT

Figure 1:
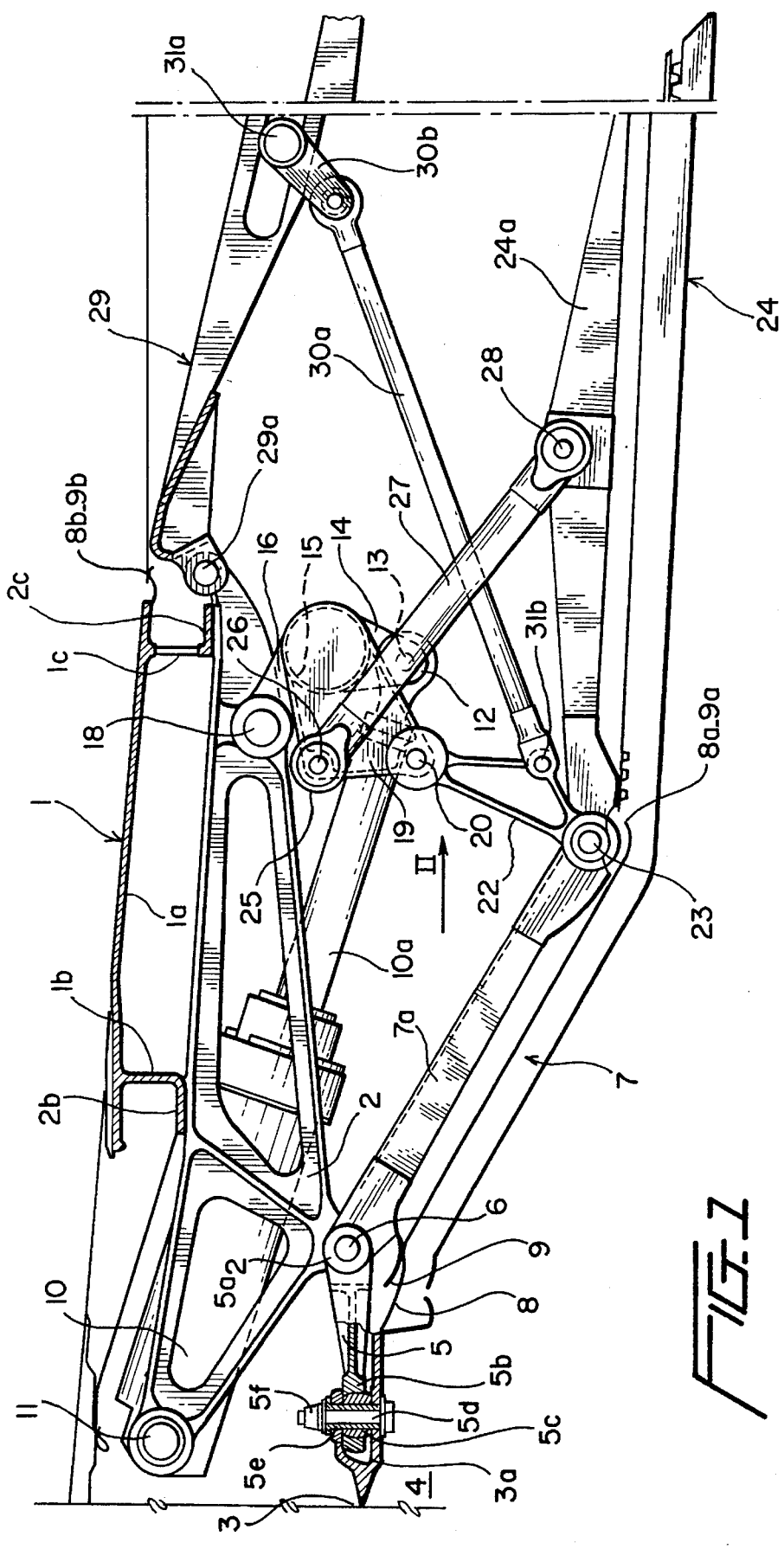
FIG. 1 depicts this form in cross section through a half-plane passing through the axis of the nozzle.

The nozzle for a jet engine schematically illustrated in FIGS. 1 and 2 comprises fixed structure 1, which extends toward the tail of the aircraft's nacelle. This fixed structure comprises skin 1a, concentric with the axis of the nozzle (toward the bottom of FIG. 1), in the shape of a cylindrical ferrule, at least in its upstream part, which must be able to slide in the downstream part of the aircraft structure, the downstream part of this structure, 1, being advantageously convergent.

Internally fixed at the two ends of this structure, is upstream flange 1b, and downstream flange 1c, annular in shape.

Twenty-four identical cross ties, generally triangular, are attached, by one side, to flange 1b (at 2b) and to flange 1c (at 2c).

The triangular cross ties in the example shown are in the radial planes of the nozzle, but they also can be oriented in parallel pairs. The pairs of cross ties 2 associated with the same convergent flap, and which radiate (or are parallel), will hereinafter be referred to as "pairs of the 1st group". The pairs of cross ties 2 associated with two adjacent convergent flaps will hereinafter be referred to as "pairs of the 2nd group".

In accordance with the present invention, the intermediate vertices of triangular cross ties 2 of a pair in the 1st group are connected to annular edge 3 of the outlet of duct 4 of the nozzle by triangular connecting rod 5, which is shown in plan view in FIG. 3. This triangular connecting rod 5 has two clevises, 5a1 and 5a2, pivotally attached to the intermediate vertices of two cross ties, 2a1 and 2a2 by pins 6. The third vertex of triangular connecting rod 5 is hinged at edge 3 of duct 4 as follows, and as is readily seen in FIG. 1. A swivel 5c is inserted in the central housing of male clevis 5b. The assembly is inserted between the two prongs of fork 3a, which itself is fixed to edge 3 of duct 4. The spread of fork 3a is greater than the thickness of clevis 5b. Male clevis 5b and fork 3a are secured by flat-headed bolt 5d that passes through a socket 5l that has the same diameter as the holes in swivel 5c and forks 3a, the whole being held together by nut 5f. As will be seen, the system comprised of fixed structure 1 and the 24 triangular cross ties 2 thus is positioned axially with respect to duct 4, while at the same time allowing for the free radial expansion of duct 4 with respect to structure 1, the structure 1 being able to slide in the downstream end part of the aircraft structure.

A first annular system of twenty-four convergent primary flaps 7 is arranged as follows. Each flap 7 has on the edges of its external face, that is, the face facing triangular cross ties 2, two stiffeners, such as 7a, that extend approximately from one end to the other of the flap in the longitudinal direction. The upstream end of each stiffener such as 7a is hinged at the intermediate vertex of cross tie 2, at end 6a of pin 6 protruding from clevis 5a1 or 5a2 of triangular connecting rod 5 (FIG. 3). The protruding end part 6a of each pin 6 should be long enough to serve as a shaft, not only for the clevis of corresponding stiffener 7a of convergent flap 7, (which extends between two triangular cross ties 2a1 and 2a2 of a pair in the 1st group) but also for corresponding clevis 5a of triangular connecting rod 5. In order to ensure tightness between edge 3 of duct 4 and each convergent flap, such as 7, two sector-shaped gutters 8 and 9 made of a relatively flexible, but very high temperature resistant material, are used. These two gutters overlap in accordance with a known arrangement, "daisy chain like", for example and, because of the elasticity, guarantee the overlap and the tightness of the joint for all positions that the convergent flap considered can assume with respect to edge 3 of duct 4.

What follows now is a description of pivoting control mechanism for each convergent flap that is controlled, and which extends between two triangular cross ties of the 1st group (i.e., those associated with the same convergent flap). In point of fact, only twelve convergent flaps are positively controlled by the mechanism about to be described. The twelve convergent flaps located between the controlled flaps, that is, the flaps hinged at the intermediate vertices of two adjacent triangular stiffeners, are installed as "follower" flaps, in a manner itself known, so as to cause them to follow the positively controlled flaps in their respective pivoting movements.

The convergent flap control mechanism shown in FIG. 1 comprises hydraulic actuating cylinder 10, the upstream end of the cylinder is hinged at the upstream vertices of two triangular cross ties, 2a1 and 2a2, by pins 11, integral with the wall of the cylinder of actuating cylinder 10, and passing freely through the holes drilled in the corresponding vertices of the aforesaid triangular cross ties. The end of rod 10a of hydraulic actuating cylinder 10 has a swivel 12 which is secured by pin 13 (FIG. 2) to clevis 14 in the mid portion of the tubular actuating lever 15. Tubular actuating lever 15 extends for a distance that depends on the width of each of the convergent follower flaps, and its length is somewhat longer than the distance between two triangular cross ties of a pair in the 2nd group. A clevis 16 is fixed to each end part of each tubular actuating lever 15, and is aligned with eye 17 formed on the downstream vertex of the corresponding triangular cross tie 2 (2a2 in FIG. 2). Pin 18, passing through holes in clevis 16 and eye 17, allow pivoting of actuating lever 15 with respect to cross ties 2a1 and 2a2 through its connection with rod 10a of actuating cylinder 10 which drives actuating lever 15. Fixed at each end of each tubular actuating lever 15, by any suitable means, (welding, for example), is a polygon-shaped gusset 19 which, as will be seen in elevation in FIG. 1, extends upstream as well as toward the bottom of FIGS. 1 and 2, along the direction of the axis of the nozzle. Swivel 21, fixed by pin 20, is installed on the vertex of polygon-shaped gusset 19, which is displaced upstream, and on the axis of the nozzle, with respect to the end of actuating lever 15, and takes one end of control rod 22. The other end of this control rod 22, closer to the axis of the nozzle, is hinged by pin 23 at the downstream end of stiffener 7a of convergent flap 7. It thus is this last convergent flap 7C that is positively controlled by connecting rod 22 when actuating cylinder 10 moves actuating lever 15, whereas the convergent flap 7S that in a transverse direction between two triangular cross ties to form part of a 2nd group pair is only a follower flap.

FIG. 4 is a schematic representation, front view, taken along the axis 0 of the nozzle of half of the annular kinematic chain which, in accordance with the present invention, simultaneously ensures control and synchronization of the pivoting movements of the different controlled convergent flaps 7C. In this scheme, lines 15 represent the actuating levers, all of which are located in the same plane perpendicular to axis 0, and each of which is driven at its middle m by the end of actuating rod 10a of corresponding actuating cylinder 10. Designated by 22 are the different connecting rods respectively hinged between the ends of actuating levers 15 and stiffeners 7a of the controlled convergent flaps 7C. These latter are shown in FIG. 4 by lines marked 7C and which, in fact, correspond to the geometric axes of the two coaxial pivots 23 (FIG. 2) of a single controlled flap 7C. It will be clearly seen in FIG. 4 that a convergent "follower" flap 7S (represented by the dashed lines) is inserted between each consecutive pair of controlled convergent flaps 7C that is, and, as has already been noted.

The second annular system of primary flaps includes twenty-four divergent flaps. This term does not exclude the fact that these flaps can be set in positions in which they are approximately parallel to the axis of the nozzle, as will be seen in FIG. 1, or in a convergent position. Each divergent flap 24 includes two longitudinal stiffeners 24a that extend at least to their respective upstream edges. The perforated upstream end of the longitudinal stiffener 24a of each divergent flap 24 is engaged on an extension 23a of pin 23 (FIG. 2), in a manner such that the upstream edge of each divergent flap 24 is hinged at the downstream edge of the corresponding convergent flap 7. A swivel 25 is fixed by pin 26 to one of the vertices of polygon-shaped gusset 19, which is displaced upstream with respect to the corresponding actuating lever 15. This swivel 25 acts as the hinge for one end of slaving connecting rod 27, the other end of which is hinged by pin 28 and if necessary by a swivel at an appropriate point on the corresponding longitudinal stiffener 24a of divergent flap 24. This arrangement is envisaged only for one of two divergent flaps, the intermediate divergent flaps being in the form of "follower flaps".

Slaving of one of two divergent flaps 24 to the pivoting movements of one of two convergent flaps 7C, thus also is realized in accordance with the present invention by an annular toothed kinematic chain. The scheme can be deduced from that shown in FIG. 4, and by replacing references 22 by those for connecting rods 27 and references 7C by 24, symbolizing the geometric axis of the two coaxial pivots 28 of each slaved divergent flap 24.

A third annular system is formed by the secondary or "cold" flaps. Each of these twelve cold flaps 29 has its upstream edge hinged about a pin 29a at the fixed structure of nozzle 1, and in particular at the respective downstream angles of two adjacent triangular cross ties 2. These cold flaps 29 extend longitudinally beyond the downstream edges of divergent flaps 24 in a manner such that they envelop, but do not make contact with, the flaps in accordance with a known nozzle principle, that of a nozzle "with ventilated base". A system of connecting rods 30a and 30b hinged together connects a predetermined point 31a on the internal face of each cold panel 29 to an intermediate point 31b of control connecting rod 22 in a manner such that the position of each pivoting cold flap 29 is slaved to that of each convergent flap 7 controlled by two connecting rods such as 22.

Devices 8a–9a and 8b–9b, which are similar to the previously described devices 8–9 ensure, respectively, the tightness between, on the one hand, the adjacent edges of convergent flaps 7 and divergent flaps 24, and on the other hand, the upstream edges of cold flaps 29 and the external downstream edge of fixed structure 1.

Figure 5:
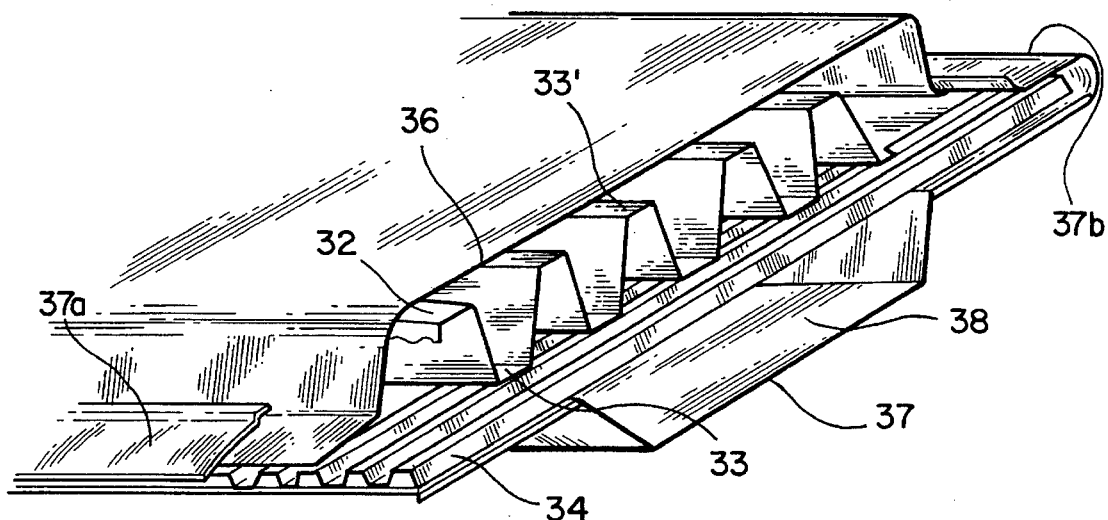
FIG. 5 is a perspective view showing one possible structure of one of the pivoting flaps with which the nozzle is fitted in accordance with the present invention.

FIG. 5 illustrates one possible structure of each of primary flaps 7 and 24. The structure illustrated in FIG. 5 is made up of a "corrugated" iron web 32, the corrugations of which are flats extending in the longitudinal direction of the flap, that is, in the direction of the nozzle axis. This web 32 is fixed in the intervals 33 between the corrugations by welding, brazing, or any other suitable process to the tops of smaller corrugations of another corrugated iron sheet with flat corrugations disposed in a transverse direction, and forming an internal skin 34. An external skin 36, without corrugations, covers web 32 and internal skin 34, the points of fixation being at the tops 33' of the corresponding flat corrugations. Finally, the face of the flap toward the nozzle axis, that is, the face that will be in contact with the hot gases, is a plate 37 shaped to provide a longitudinal duct 38 underneath the internal skin 34, the edge of plate 37 being bent at 37a and 37b in a manner such as to cover the lower and upper faces of the edges of internal skin 34, and with which the aforesaid plate has no tie point.

This structure provides the following advantages:

from a heat point of view, plate 37 protects the rest of the flap from direct contact with the very hot gases ejected through the nozzle;

cooling air can be circulated through duct 38 by providing appropriate holes;

corrugated plates 32 and 34, on the other hand, provide for the free expansion of the flap in the longitudinal and transverse directions, thanks to a slight opening of the corresponding corrugations, these expansions taking place freely in the absence of points of fixation between plate 37 and the other structural members;

from a mechanical point of view, a flap made in this manner has a high value for the ratio of its moment of inertia to its stiffness because, in particular, of the presence of plates 32 and 34, the corrugations of which are transverse with respect to each other. This makes it possible, in particular, to use thin, low density alloy plates to fabricate the flaps, thus resulting in a very lightweight flap.

Figure 6:
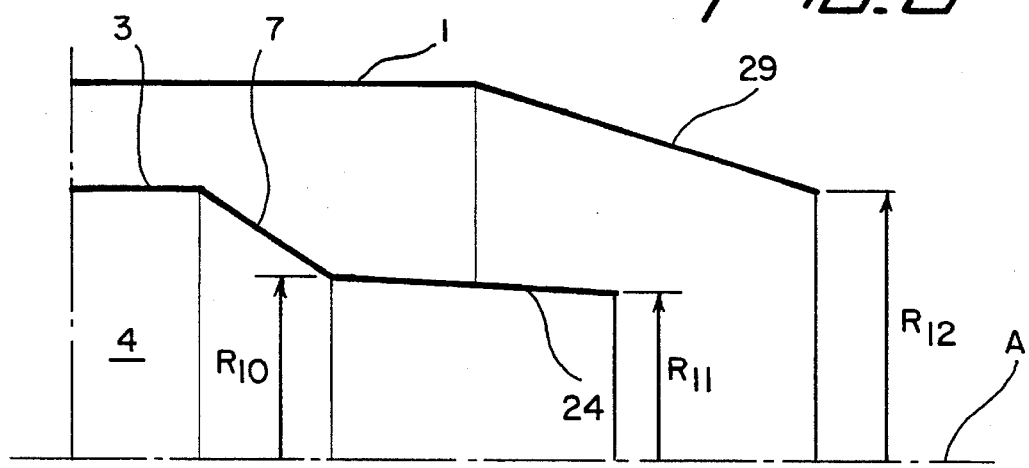
FIGS. 6 and 7 are schematic views illustrating the two principal configurations of the nozzle in accordance with the present invention, respectively.
Figure 7:
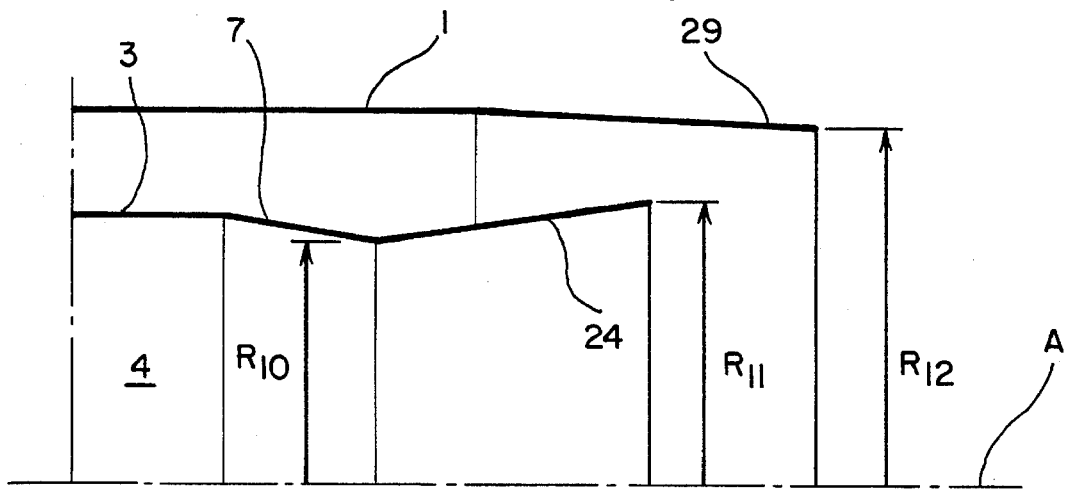

FIG. 6 is a representation of fixed structure 1 of the nozzle and the outlet 3 of duct 4 with the respective positions of convergent flaps 7, divergent flaps 24 (in this case approximately parallel to the A axis of the nozzle) and cold flaps 29 with respect to the A axis of the nozzle, for a typical configuration of this latter, which corresponds to an aircraft, the jet engine of which is fitted with the nozzle described in the foregoing, flying at subsonic cruising speed. FIG. 7 is a similar scheme, one corresponding to the case in which a jet engine fitted with the nozzle described in the foregoing, is operating in the afterburner mode, and in which mode very significant acceleration is possible. Convergence of the part of the nozzle formed by the annular system of flaps 7 when operating in this afterburner mode is less than in the case when operating in the cruising mode at subsonic speed, whereas the follower part of the nozzle, made up of flaps 24, presents a pronounced divergence. Cold flaps 29 form a convergent envelope in both cases, the convergence being relatively small for the afterburner mode, however. It is understood, of course, that the control mechanism described in the foregoing makes it possible to impart to the nozzle all the intermediate configurations between those illustrated in FIGS. 6 and 7, respectively. It will be seen that the different nozzle configurations are represented by different values of radius R10 at the level of the nozzle throat of the nozzle outlet radius R11, and of the outlet radius R12 of the convergent formed by cold flaps 29. If the areas of the corresponding sections are designated S10, S11 and S12, it is readily seen that the ratios S11/S10 and S12/S10 are functions of S10, that is, of the area of the nozzle throat.

Figure 8:
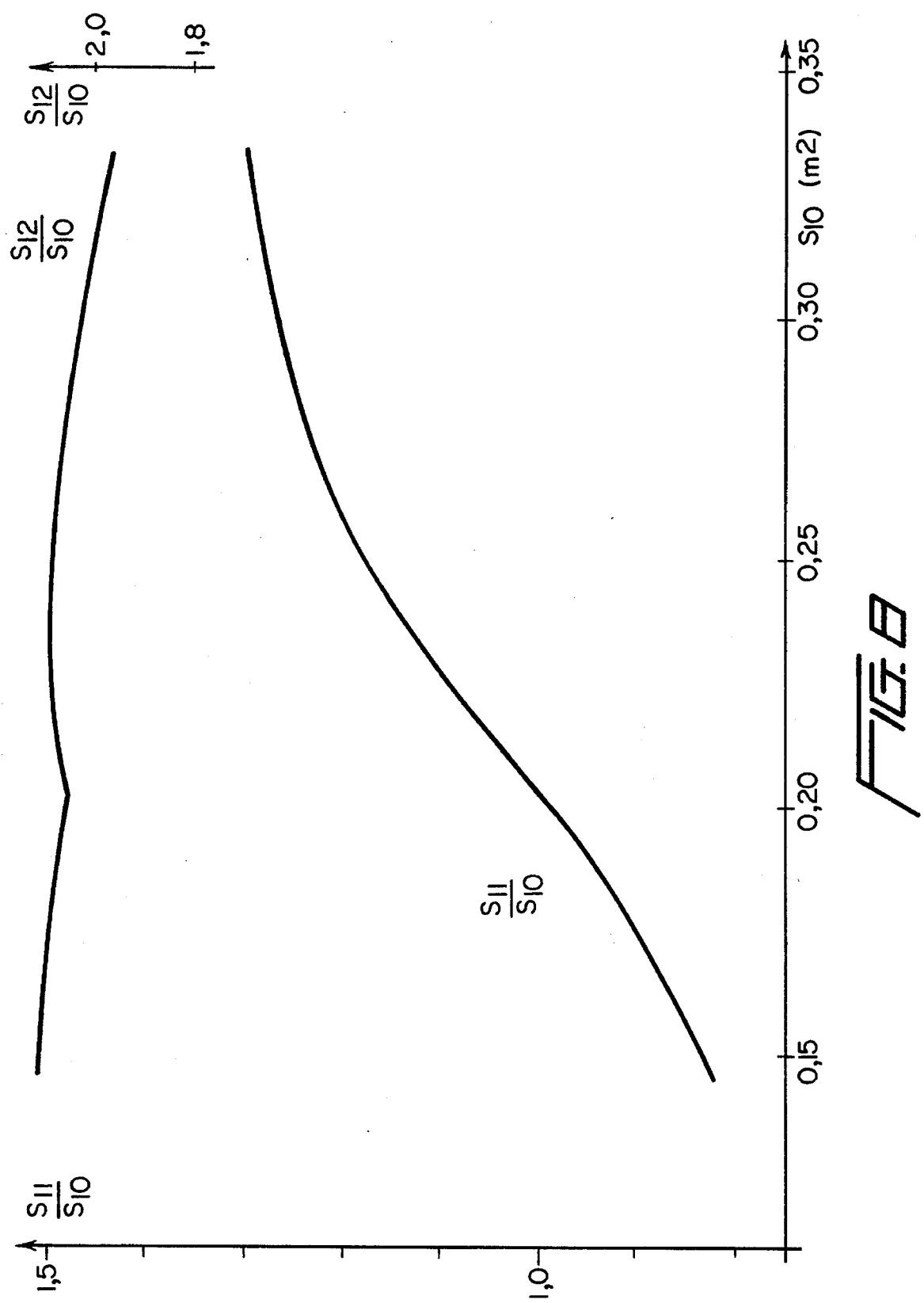
FIG. 8 is a diagram illustrating an optimized case for a particular mission of the aircraft, the variations in the two principal parameters of the nozzle in accordance with the present invention for different angles of the flaps.

The diagram in FIG. 8 reproduces curves representative of these two functions of the variable S10 in one embodiment of the nozzle described in the foregoing, for which the throat section varies between 0.15 m and about 0.35 m$^2$. In this embodiment flaps 24 can take up a convergent position that yields an S11/S10 section ratio of the order of 0.85, one that is particularly adapted to partial subsonic flight conditions. It is understood, of course, that these two functions, and their representative curves, depend on the dimensions given to the mechanism illustrated in FIGS. 1 and 2, already described in the foregoing and, in particular, on the relative positions of the different hinges 18, 15, 20, 23, 26, 28, 31a and 31b, as well as on the lengths of the different connecting rods 22, 27, 30a, 30b, and that these parameters are determined so as to adapt the laws of variation in S11/S10 and S12/S10 to the mission of the aircraft.

The principal role of connecting rods 5, by preference shaped like an isosceles triangle, is to transmit to edge 3 of nozzle duct 4 the drag forces applied to the different nozzle main flaps in accordance with their positions, while at the same time compensating, by their pivoting movements, for the differences in thermal expansion that can take place between, on the one hand, edge 3 of duct 4, and on the other hand, the fixed structure 1-2 of the nozzle.

The present invention is not limited to the embodiment described in the foregoing. It encompasses all variations. Each of the connecting rods 27 that couple one edge of divergent flap 24 to the corresponding actuating lever 15 through polygon-shaped gusset 19, can be modified to include arrangements for adjusting its length. These arrangements can be of the internal spring and stop type, such as that described in the applicant's French Patent No. 72.13397, for example. An arrangement such as this makes it possible to modify the law of variation for the ratio S11/S10 as a function of the area of the nozzle throat S10. Realization of tubular actuating levers 15 and gussets 19, fixed at their ends, is optional. The arrangement of triangular connecting rods 5 is optional. The arrangement of triangular cross ties 2 is optional, because the fixed structure of the nozzle can be given any other shape appropriate for installing control actuating cylinders 10, and the hinges for the upstream edges of convergent flaps 7 and clevises 16 of actuating levers 15. Finally, the annular toothed kinematic chain in accordance with the present invention, and which is represented schematically in FIG. 4, also could be used, as could the mechanisms illustrated in FIGS. 1 and 2 and as described in the foregoing, in the case of a nozzle without cold flaps 29. It is understood, of course, that in all cases the planning of the number of primary flaps, and the number of secondary flaps, is optional, as is the existence of the corresponding follower flaps, which can be replaced by controlled, or slaved, flaps.

We claim:

1. In a supersonic nozzle for a turbojet engine having a longitudinal axis having a plurality of convergent nozzle flaps forming an annular convergent nozzle portion and a plurality of divergent nozzle flaps forming an annular divergent nozzle portion downstream of the convergent nozzle portion, the improved flap attaching and actuating mechanism comprising:
    a). a plurality of cross-tie members attached internally to the engine structure oriented generally parallel to the longitudinal axis, each cross-tie member having first, second and third attachment points;
    b). a plurality of connecting rod members pivotally attached to the engine structure and to adjacent pairs of cross-tie members at their first attachment points;
    c). first attachment means to pivotally attach an upstream end of each convergent flap to the first attachment points of adjacent cross-tie members;
    d). an actuating lever pivotally attached to alternate pairs of cross-tie members at their second attachment points;
    e). actuating cylinder means having an extendable and retractable piston rod attached to the actuating lever and a cylinder attached to the third attachment points of the alternate pairs of cross-tie members such that extension and contraction of the piston rod causes the actuating lever to pivot about its attachment to the cross-tie members;
    f). first control rod means each having a first end connected to the actuating levers and a second end connected to a downstream end of a convergent nozzle flap; and,
    f). second control rod means, each having a first end connected to the actuating levers and a second end connected to a divergent nozzle flap.

2. The improved supersonic nozzle as defined in claim 1 wherein the cross-tie members are generally triangular in shape and wherein the first, second and third attachment points are located at the vertices of the triangle.

3. The improved supersonic nozzle as defined in claim 2 wherein the first attachment point on the cross-tie members is located between the second and third attachment points.

4. The improved supersonic nozzle as defined in claim 3 wherein the second attachment point on the cross-ties members is located downstream of the first and third attachment points.

5. The supersonic nozzle as defined in claim 4 wherein the axis of the pivot attachment between the connecting rod members and the cross-tie members is coaxial with the point axis of the first attachment means.

6. The supersonic nozzle as defined in claim 5 wherein the axis of the pivot attachment between the connecting rod members and the engine structure extends generally perpendicular to the longitudinal axis of the engine.

7. The supersonic nozzle as defined in claim 1 further comprising: a plurality of cold flaps pivotally attached at their upstream ends to the engine structure such that they are disposed radially outwardly of the divergent nozzle flaps; and, third control rod means each having a first end pivotally connected to a cold flap and a second end pivotally attached to the first control rod means.

8. The improved supersonic nozzle as defined in claim 7 wherein the cross-tie members are generally triangular in shape and wherein the first, second and third attachment points are located at the vertices of the triangle.

9. The improved supersonic nozzle as defined in claim 8 wherein the first attachment point on the cross-tie members is located between the second and third attachment points.

10. The improved supersonic nozzle as defined in claim 9 wherein the second attachment point on the cross-ties members is located downstream of the first and third attachment points.

11. The supersonic nozzle as defined in claim 10 wherein the axis of the pivot attachment between the connecting rod members and the cross-tie members is coaxial with the point axis of the first attachment means.

12. The supersonic nozzle as defined in claim 11 wherein the axis of the pivot attachment between the connecting rod members and the engine structure extends generally perpendicular to the longitudinal axis of the engine.

* * * * *